Aug. 19, 1941.    B. F. HAMILTON    2,252,848
BOTTLE CARRIER
Filed April 5, 1940    2 Sheets-Sheet 1
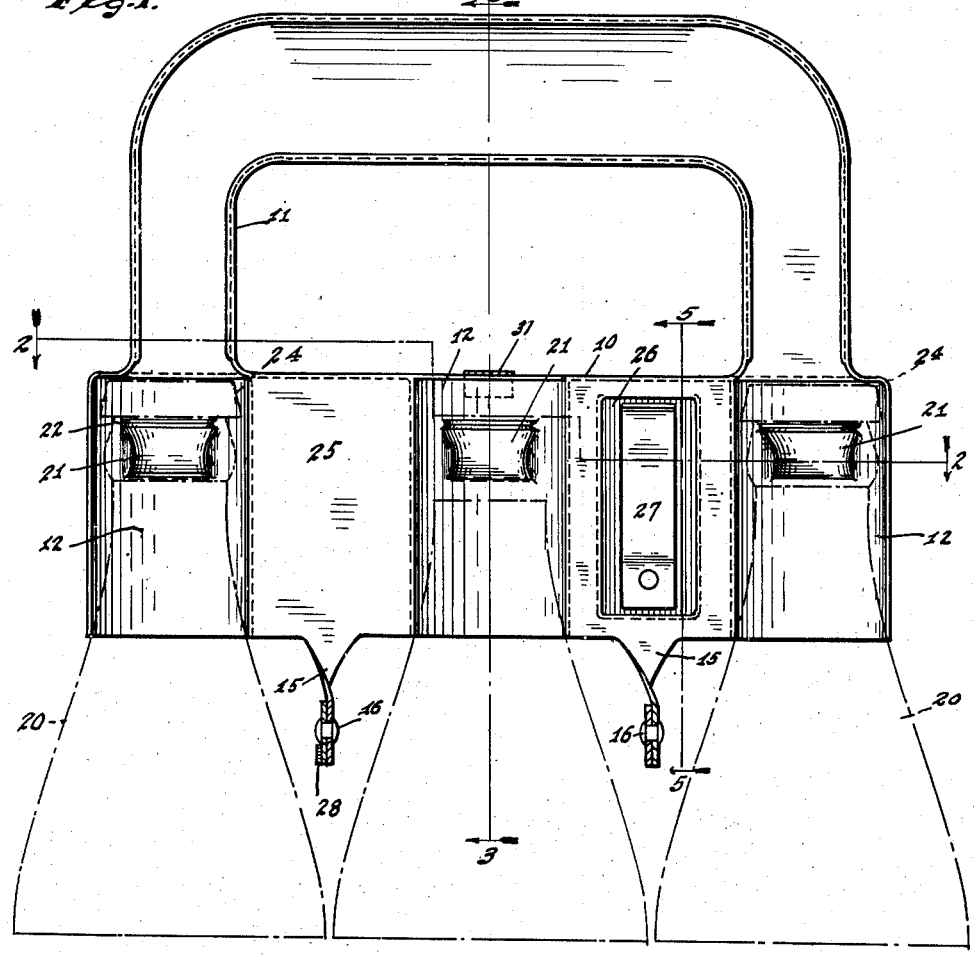
INVENTOR.
BERTIS F. HAMILTON,
BY
ATTORNEYS.

Aug. 19, 1941.  B. F. HAMILTON  2,252,848
BOTTLE CARRIER
Filed April 5, 1940  2 Sheets-Sheet 2

INVENTOR.
BERTIS F. HAMILTON,
BY
ATTORNEYS

Patented Aug. 19, 1941

2,252,848

UNITED STATES PATENT OFFICE 2,252,848

BOTTLE CARRIER

Bertis F. Hamilton, Columbus, Ind., assignor to Noblitt-Sparks Industries, Inc., Columbus, Ind., a corporation of Indiana Application April 5, 1940, Serial No. 328,014

5 Claims. (Cl. 294—87)

It is the object of my invention to produce a device which will facilitate the handling of bottles and which will make it possible for an operator quickly to pick up, transfer, and release a plurality of bottles with each hand. A further object of my invention is to produce such a device which can be used as a bottle carrier in more or less permanent association with a plurality of bottles.

In carrying out my invention, I provide a pair of hingedly interconnected members, desirably sheet-metal stampings, which are provided in their opposed faces with pairs of recesses each pair of which is shaped, when the members are together, to receive and retain the neck of a bottle. Springs acting between the members normally serve to hold them apart, in which condition the device may be applied to or removed from the necks of a plurality of bottles; and above the recesses, the members are provided with co-operating grip portions by which the members may be brought together, against the force of the aforesaid spring means, to grip the bottles to which the device has been applied. If desired the members may be provided with a latch which releasably holds them together against the force of the spring means, thereby adapting the device for use as a bottle carrier.

Figure 3:
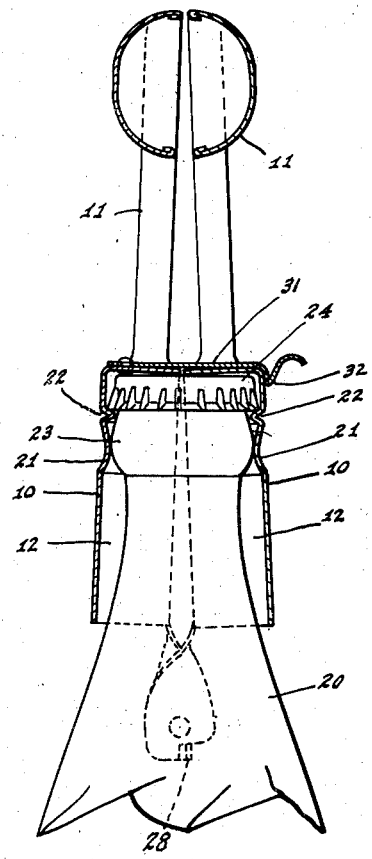
Figure 4:
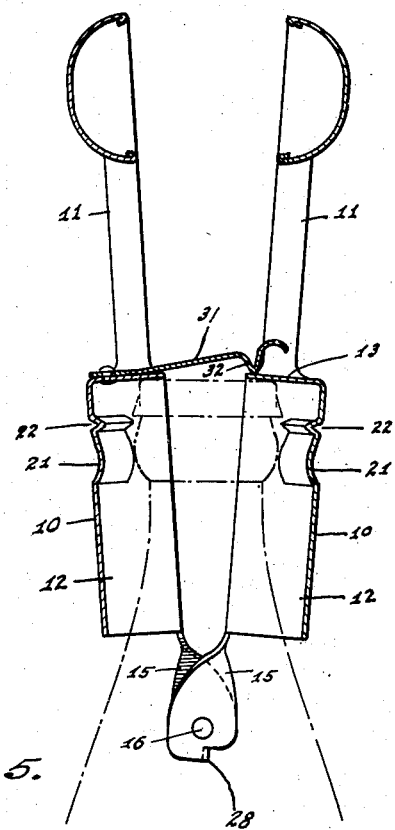
Figure 5:
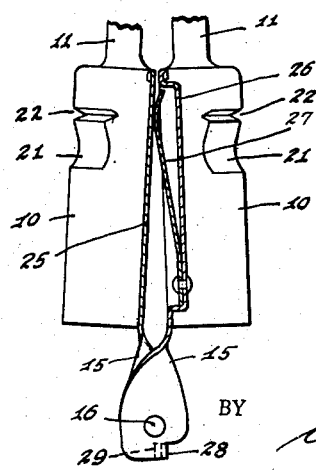

The accompanying drawings illustrate my invention: Fig. 1 is an elevation of the inner face of one of the recessed members embodied in the device; Fig. 2 is a horizontal section on the line 2—2 of Fig. 1; Fig. 3 is a vertical section on the line 3—3 of Fig. 1 showing the device closed or in bottle-carrying condition; Fig. 4 is a view similar to Fig. 3, but showing the device opened, or in bottle-releasing condition; and Fig. 5 is a section on the line 5—5 of Fig. 1.

As previously indicated each of the two pivotally interconnected members constituting the principal parts of the device is desirably formed as a sheet-metal stamping. Each of these members has a body portion 10 from which there extends upwardly a D-handle 11 of a general channel-shape in cross-section. The body portion 10 of each member is formed with a plurality of vertically extending grooves 12 of generally semi-circular cross-section open at their lower ends and closed at their upper ends as indicated at 13. Between adjacent grooves 12, each of the members is provided with downwardly extending ears 15 the lower ends of which are twisted through 90°, as will be clear from Fig. 1, the ears of the two members being pivotally interconnected as by means of aligned rivets 16.

The recesses 12 in each member are disposed respectively opposite the recesses 12 in the other member, the recesses being so dimensioned that each pair is adapted to receive the upper end of the neck of a bottle 20, as will be evident from Figs. 1 and 3. For the purpose of retaining a bottle in each pair of recesses, the circular wall of each recess is provided with a bead 21 which is inwardly convex in cross-section and with an inwardly projecting rib 22 located above the bead. The beads 21 and ribs 22 are so located relative to the closed ends 13 of the recesses that when the two members are brought together upon a plurality of capped bottles in the position illustrated in Fig. 3 the beads 21 will engage the customary bead 23 on each bottle neck while the ribs 22 will project immediately beneath the rim of the bottle-cap 24. Desirably, the beads 21 are so shaped as to engage the bead 23 on the bottle at a point slightly below the plane of maximum diameter of that bead.

To lower manufacturing costs, the two members are preferably identical in shape. Between the center recess 12 and one of the end recesses, each member is formed with a flat surface 25, while the corresponding portion of the member between the central bottle-receiving recess 12 and the other end bottle-receiving recess is recessed as indicated at 26 to receive a leaf-spring 27 the lower end of which is secured to the bottom of the recess 26 and the upper end of which acts against the surface 25 of the other member tending to swing the two members into the position illustrated in Fig. 4. One ear 15 on each of the members may be provided with an abutment-portion 28 bent into the plane of the associated ear on the other member and co-operating with a shoulder 29 thereon to limit opening of the two members under the influence of the spring 27.

Owing to the influence of the springs 27, the two members constituting the principal parts of the device normally occupy the position illustrated in Fig. 4, the upper ends of the handles being spaced apart, but not too far apart to be encircled by the thumb and forefingers of an operator. With the device in this condition, it is lowered over the tops of three aligned bottles, or into the position indicated in Fig. 1, and the operator then closes his hand to bring the two handles 11 together, or into the position illustrated in Fig. 3. In this condition, each pair of beads 21 on the two members grips the bead 23 on one of the bottles 20; and, if the bottles are capped, the ribs 22 project inwardly beneath the rim of the bottle cap. In this condition, the device may be lifted, carrying the bottles with it; and when the bottles are transferred to the new location, the operator permits the handles 11 to separate under the influence of the spring 27, thus releasing the grip of the device upon the bottles. When the bottles are suspended within the closed device, the major portion of the weight of the bottles and their contents is transferred from the bottle-bead 23 to the beads 21, the ribs 22 serving principally as auxiliary bottle-retaining elements. When empty bottles are lifted the device will set lower on the bottles owing to the absence of the cap 24, and the beads 21 will grip the bottle-bead 23 farther below its plane of maximum diameter, thus providing a more positive grip.

If desired, the device may include a releasable latch for holding the two members together in the position illustrated in Fig. 3. As shown, this latch takes the form of a strip 31 of resilient material which is secured to one of the members and is provided near its free end with a shoulder 32 adapted to engage the remote side of the other member, as will be clear from Fig. 3. By the use of a latch of this kind, the device may be permanently applied to a plurality of bottles adapting them for sale as a unit.

Since, in the preferred form of the device, the two members are formed of sheet-metal, the beads 21 will possess sufficient elasticity to insure an effective grip upon all the bottles being carried. That is, if, as the result of inaccuracies in manufacture or inequalities in the diameters of the bottle-beads 23, one bottle-bead is gripped before the others, the members will yield under the closing effort applied to the handles 11 to permit the remaining bottle-beads to be gripped.

I claim as my invention:

1. A device for handling bottles, comprising a pair of members hingedly interconnected on a horizontal axis, the opposed faces of said members above such axis being provided with a plurality of pairs of downwardly opening recesses, the two recesses of each pair being arranged respectively in said two members to receive the neck of a bottle having a bead near its upper end and a crown cap above said bead, said recesses having closed upper ends adapted to engage the cap on a bottle and thereby locating the device vertically relative to the bottle, the walls of said recesses being provided with inwardly projecting ribs adapted to extend beneath the rim of the bottle cap and being formed to engage such bead below its plane of greatest diameter when said two members are brought together by movement about their axis of interconnection, spring means tending to force said members apart, and a handle on each of said members, said handles having opposed grip portions parallel to the axis of interconnection of said members and disposed above the recessed portions of the members.

2. A device for handling bottles, comprising a pair of members hingedly interconnected on a horizontal axis, the opposed faces of said members above such axis being provided with a plurality of pairs of downwardly opening recesses, the two recesses of each pair being arranged respectively in said two members to receive the neck of a bottle having a bead near its upper end, the upper end of at least one of said recesses being closed to engage the upper ends of the bottle neck and thus locate the device relative to the bottle, the walls of said recesses being formed to engage such bead below its plane of greatest diameter when said two member are brought together by movement about their axis of interconnection, spring means tending to force said members apart, and a handle on each of said members, said handles having opposed grip portions parallel to the axis of interconnection of said members and disposed above the recessed portions of the members.

3. The invention set forth in claim 2 with the addition of releasable means for holding said two members together against the influence of said spring means.

4. The invention set forth in claim 2 with the addition that said two members are formed as sheet-metal stampings.

5. A device for handling bottles, comprising a pair of members hingedly interconnected on a horizontal axis, the opposed faces of said members above such axis being provided with a plurality of pairs of downwardly opening recesses, the two recesses of each pair being arranged respectively in said two members to receive the neck of a bottle having a bead near its upper end and a crown cap above said bead, said recesses having closed upper ends adapted to engage the cap on a bottle and thereby locating the device vertically relative to the bottle, the walls of said recesses being provided with inwardly projecting ribs adapted to extend beneath the rim of the bottle cap when said two members are brought together by movement about their axis of interconnection, spring means tending to force said members apart, and a handle on each of said members, said handles having opposed grip portions parallel to the axis of interconnection of said members and disposed above the recessed portions of the members.

BERTIS F. HAMILTON.